United States Patent
Bacon et al.

(10) Patent No.: US 7,370,787 B2
(45) Date of Patent: May 13, 2008

(54) COMPRESSOR ROTOR AND METHOD FOR MAKING

(75) Inventors: Isabelle Bacon, Candiac (CA); Simon John Peter Durham, Westmount (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 37 days.

(21) Appl. No.: 10/734,213

(22) Filed: Dec. 15, 2003

(65) Prior Publication Data

US 2005/0127138 A1     Jun. 16, 2005

(51) Int. Cl.
*B23K 20/12* (2006.01)

(52) U.S. Cl. .................. 228/112.1; 228/114.5; 228/159; 29/889.1

(58) Field of Classification Search .......... 228/112.1, 228/159, 160, 162; 29/889, 889.21, 889.7
See application file for complete search history.

(56) References Cited

U.S. PATENT DOCUMENTS

| | | | |
|---|---|---|---|
| 3,273,233 A | 9/1966 | Oberle et al. | |
| 3,421,201 A | 1/1969 | Oberle et al. | |
| 4,074,559 A | 2/1978 | Beane et al. | |
| 4,087,038 A | 5/1978 | Yagi | |
| 4,705,463 A | 11/1987 | Joco | |
| 4,743,165 A | 5/1988 | Ulrich | |
| 4,784,572 A | 11/1988 | Novotny et al. | |
| 4,850,802 A | 7/1989 | Pankratz et al. | |
| 4,873,751 A | 10/1989 | Walker et al. | |
| 4,883,216 A | 11/1989 | Patsfall | |
| 4,903,887 A | 2/1990 | Thrower | |
| 4,934,583 A | 6/1990 | Patsfall | |
| 4,944,660 A | 7/1990 | Joco | |
| 5,048,743 A * | 9/1991 | Walker et al. ............. 228/44.3 |
| 5,183,390 A * | 2/1993 | Amos ......................... 416/224 |
| 5,314,106 A | 5/1994 | Ambroziak | |
| 5,511,949 A | 4/1996 | Thore | |
| 5,518,562 A | 5/1996 | Searle et al. | |
| 5,533,602 A | 7/1996 | Wörner et al. | |
| 5,603,448 A | 2/1997 | Woerner et al. | |
| 6,095,402 A | 8/2000 | Brownell et al. | |
| 6,324,831 B1 | 12/2001 | Izadi et al. | |
| 6,488,469 B1 | 12/2002 | Youssef et al. | |
| 6,499,953 B1 | 12/2002 | Bellerose et al. | |
| 6,524,072 B1 | 2/2003 | Brownell et al. | |
| 6,589,015 B1 | 7/2003 | Roberts et al. | |

FOREIGN PATENT DOCUMENTS

| | | | |
|---|---|---|---|
| DE | EP 816007 | * | 3/2003 |
| EP | 0 305 113 B1 | | 10/1993 |
| FR | 2739658 | * | 4/1997 |

OTHER PUBLICATIONS

The A to Z of Materials (Azom.com) "Advanced Materials for Gas Turbine Engines High Pressure Compressors" ;Primary Author: Stewart Miller, Abstracted from Materials World, vol. 4, pp. 446-448, 1996 "Advanced Materials Mean Advanced Engines".

* cited by examiner

*Primary Examiner*—Kiley Stoner
(74) *Attorney, Agent, or Firm*—Ogilvy Renault LLP

(57) ABSTRACT

A method an apparatus for a gas turbine compressor rotor is provided which offers improved characteristics to the rotor when used with at least titanium IMI 834. Mechanical work is optimized through forging to provide at least improved low cycle fatigue life to the part.

19 Claims, 4 Drawing Sheets

COMPRESSOR ROTOR AND METHOD FOR MAKING

FIELD OF THE INVENTION

The present invention relates to an improved integrally-bladed compressor rotor for use in a gas turbine engine, and more particularly, one that is particularly suited for use with IMI834 titanium.

BACKGROUND OF THE ART

Monobloc compressor rotors, such as integrally-bladed rotors (IBRs) and one-piece impellers for gas turbine compressors may be formed by forging, heat treating and then machining. A certain amount of mechanical working of the material during forging is necessary to provide good mechanical properties, such as a high low cycle fatigue (LCF) life. Compressors must also be lightweight and maintain good mechanical properties at high temperature, and may have operational rotational speeds in excess of 30,000 rpm.

Once a mult has been forged into a blank and heat treated, the rotor blades are then machined from the forging. Alternately, as shown in U.S. Pat. No. 6,095,402, rather than machining the entirety of the blades, some axial-flow rotor designs permit the hub blade stubs to be machined from the blank, and then separately-fabricated airfoils are friction welded on to the stubs.

The rotor must also be attached to a shaft. Referring to FIGS. 2a and 2b, conventional possibilities for attachment of an impeller are to mechanically fasten the impeller / to a flanged shaft S with bolts B (FIG. 2a) or to provide a stub shaft SS integrally with impeller /, the stub shaft SS being threaded for connection to shaft S (FIG. 2b). Other options not shown are keyed shafts and friction fits. The approach of FIG. 2b is often preferred for airborne gas turbine applications to 2a, since the mechanical fasteners of FIG. 2a add unwanted weight, while keyed shafts add stress concentrations, and all designs present dynamics issues to the designer. The integral shaft impeller of FIG. 2b is provided by extruding a stub shaft SS during forging.

As described briefly above, in the forging process, large amounts of deformation are required to randomise the metallurgical texture and disrupt and remove the regions of weakness from the forging, to there by provide good mechanical properties such as LCF life. After mechanical working, heat treatment is performed. If the cross sectional area is beyond a limiting value, known as the "ruling section", it is not possible to adequately heat treat and forge the centre of the forging, which reduces the mechanical properties of the alloy in that region. The somewhat trapezoidal shape of the impeller cross-section naturally makes this forging and heat treatment issue much more of a concern for the manufacture of impellers than it does for disc-type rotors. Also, the inclusion of an extruded shaft portion to the impeller greatly increases the cross sectional area of the part, exacerbating forging issues.

Although prior art forging and forging +extrusion processes work well with many titanium compressor rotor designs, a relatively new titanium alloy known as IMI834 (generally Ti-5.8Al, 4Sn, 3.5Zr, 0.7Nb), or Timetal 834, (a trade mark of Titanium Metals Corporation), presents new problems to the field of compressor rotor manufacture not adequately addressed by prior art technologies. IMI834 is known to have highly desirable properties for aircraft engine components, such as high temperature creep resistance, high tensile and fatigue strengths, and a relatively low density, however IMI834 also has several intrinsic material properties which make it a uniquely difficult material with which to work, especially in the provision of integral compressor rotors for gas turbines. Prior art manufacturing techniques result in a poor LCF life for gas turbine impellers, for example.

Therefore a need exists to address the problems of manufacturing compressor rotors, and particularly impellers, from IMI834 to provide improved LCF lives.

SUMMARY OF THE INVENTION

It is one aim of the present invention to provide an IMI834 impeller with improved properties and performance and which is well-suited for use as a high pressure gas turbine compressor rotor.

One aspect of the present invention provides a method providing a gas turbine compressor impeller, the method comprising the steps of forging IMI834 titanium to provide a blank having a back face, forging a stump portion on the blank, the stump portion extending from the back face, providing a metal alloy stub shaft, and friction welding the stub shaft to the stump portion to provide a welded assembly.

In another aspect, the invention provides a method for making an impeller rotor for a gas turbine engine, the method comprising the steps of forging a blank from IMI834 titanium alloy, providing a metal alloy component, friction welding the component to the blank to provide a welded assembly, heat treating the welded assembly to at least relieve a weld zone, and then removing weld flashing from the weld zone.

BRIEF DESCRIPTION OF THE DRAWINGS

The present invention will now be disclosed, by way of examples, in reference to the following drawings, in which.

DESCRIPTION OF THE PREFERRED EMBODIMENTS

Figure 1:
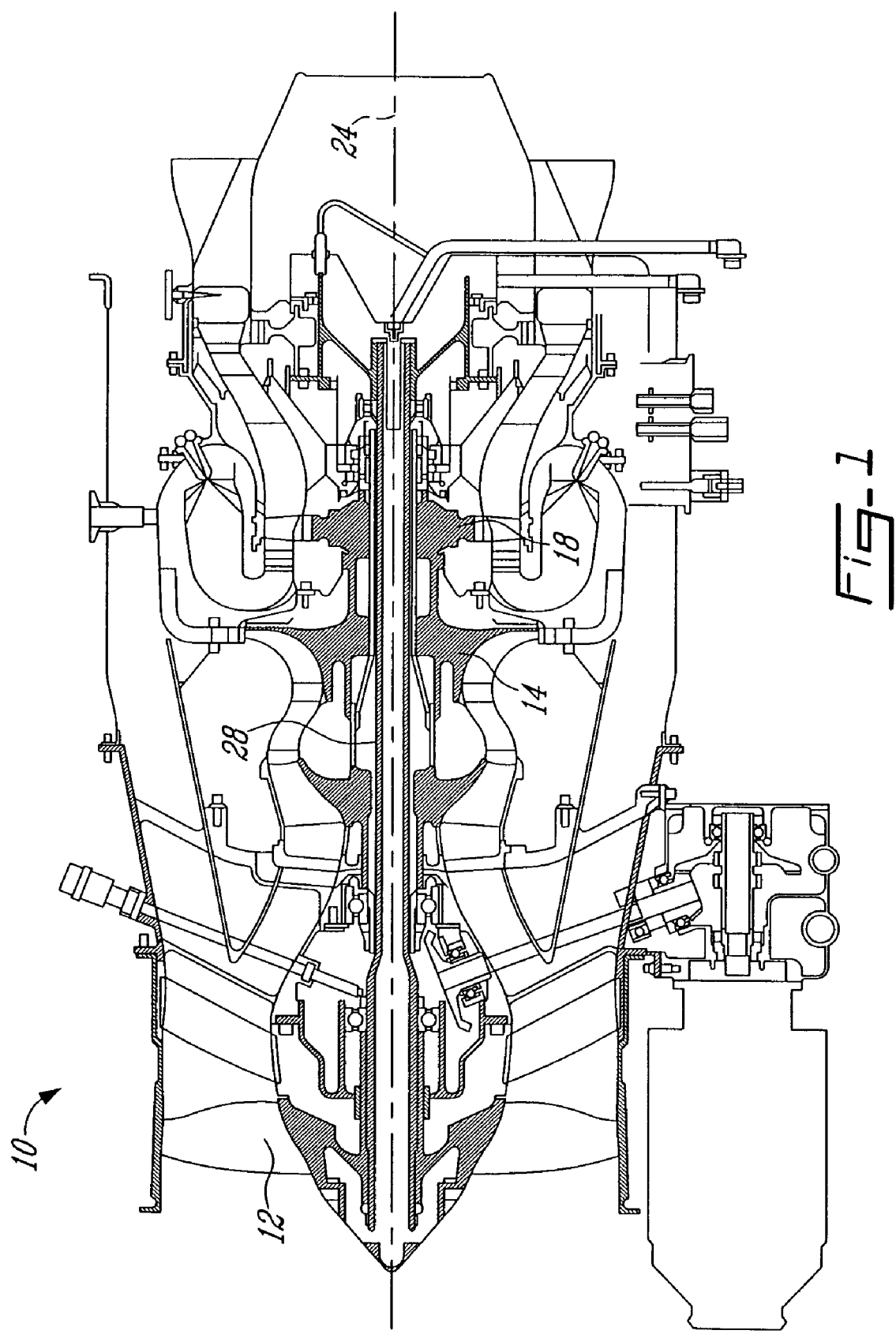
FIG. 1 is a cross-sectional view of a gas turbine engine.
Figure 2:
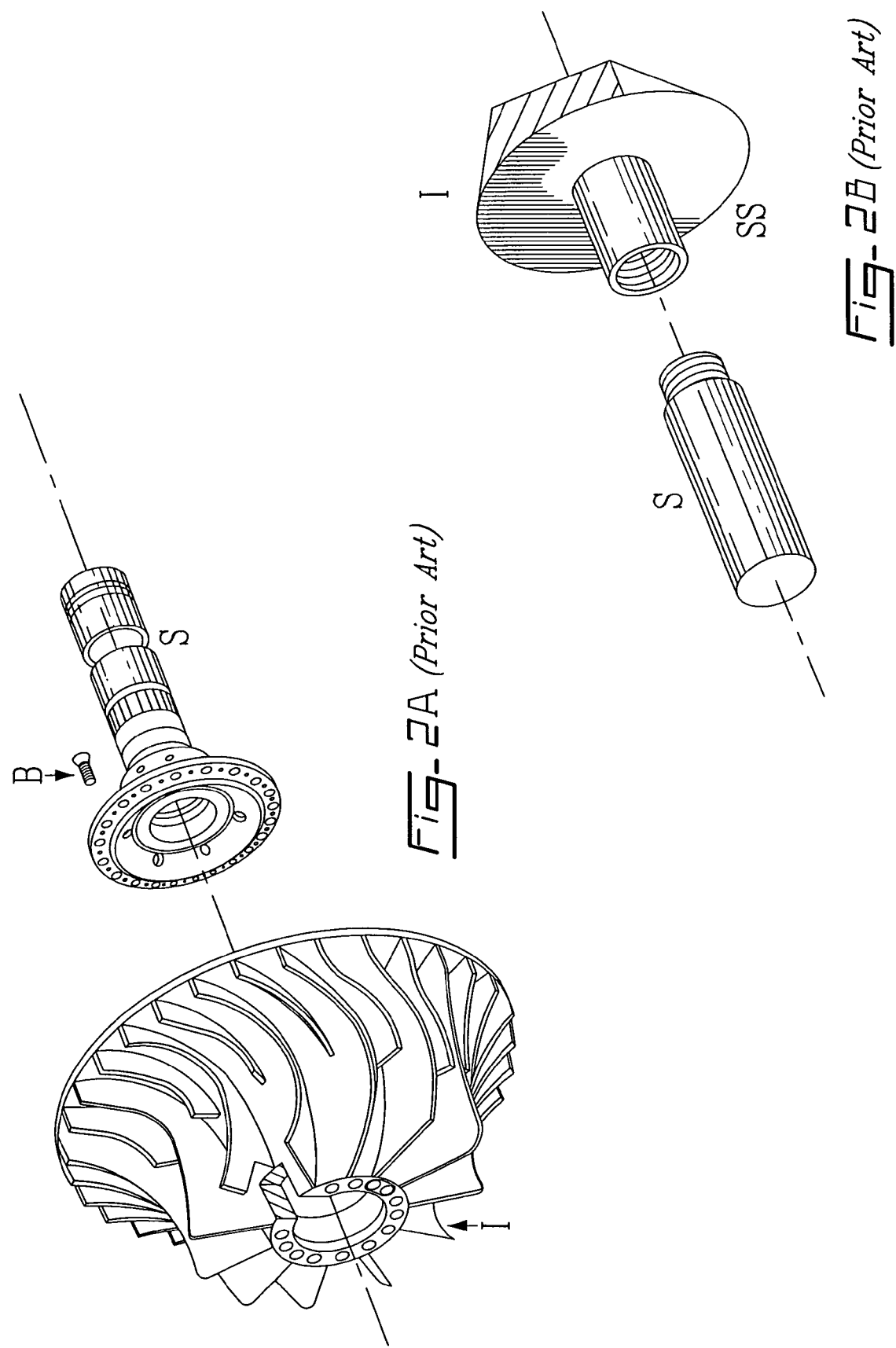
FIGS. 2a-2b are isometric views of prior art compressor rotors.
Figure 3:
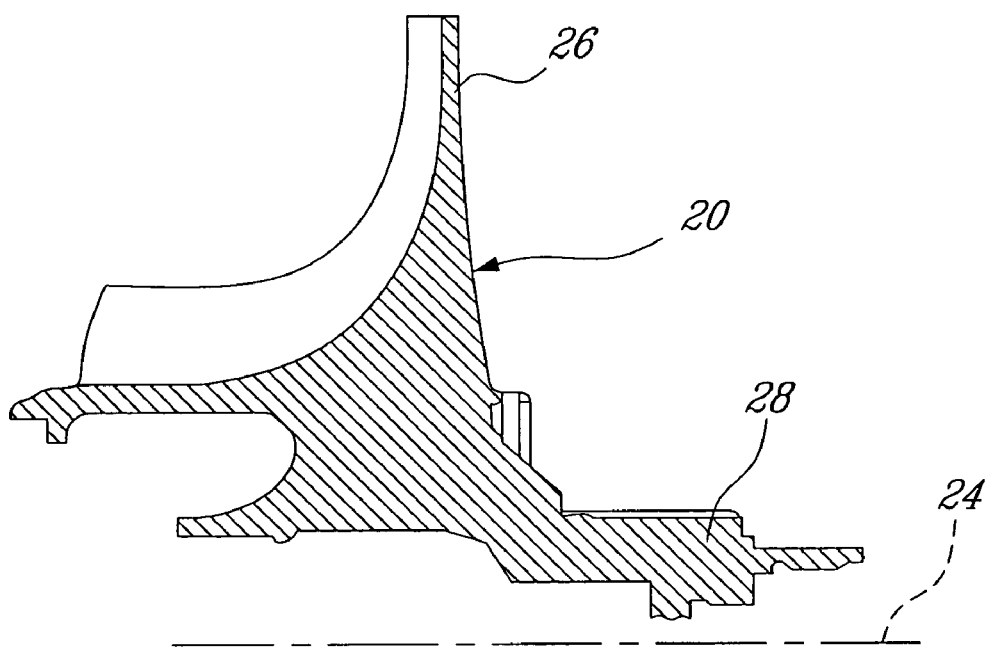
FIG. 3 is an axial cross-sectional view of a prior art impeller.

FIG. 1 illustrates a gas turbine engine 10 of a type preferably provided for use in subsonic flight, generally comprising in serial flow communication a fan 12 through which ambient air is propelled, a multistage compressor 14 for pressurising the air, a combustor 16 in which the compressed air is mixed with fuel and ignited for generating an annular stream of hot combustion gases, and a turbine 18 for extracting energy from the combustion gases. Referring to FIG. 3, compressor 14 according to the prior art includes an impeller rotor 20 adapted for rotation about a central axis 24. The impeller 20 includes a plurality of radially extending blades 26 and a stub shaft 28 which is threaded (not shown) for connection to a high pressure spool of the engine. Impeller 20 is formed by forging a blank, including an extruded shaft portion 28, then heat treating and then machining the heat-treated blank to provide the impeller and blades 26.

The work done in extruding stub shaft 28 typically provides very satisfactory properties to the prior art titanium alloys, such as titanium 6% Al 4%V, titanium 6% Al 2% Sn 4% Zr 2% Mo or titanium 6% Al 2% Sn 4% Zr 6% Mo. However, as discussed above, despite its numerous desirable mechanical properties, it has been found that the unique properties of IMI834 are such that a similar extrusion forging would be subject to the presence of regions of weakness that would not be able to bear the induced internal stresses during operation. Thus, IMI834 cannot be used to make an adequate impeller 20 since the mechanical properties IMI834 attains through the prior art forging and forging+extrusion processes do not meet required standards. If IMI834 is to be used to provide an impeller, therefore, an improved method of providing the impeller is required.

According to the present invention, a novel configuration and method is provided which permits IMI834 to be used to reliably and simply provide an impeller for use in a gas turbine engine.

Figure 4:
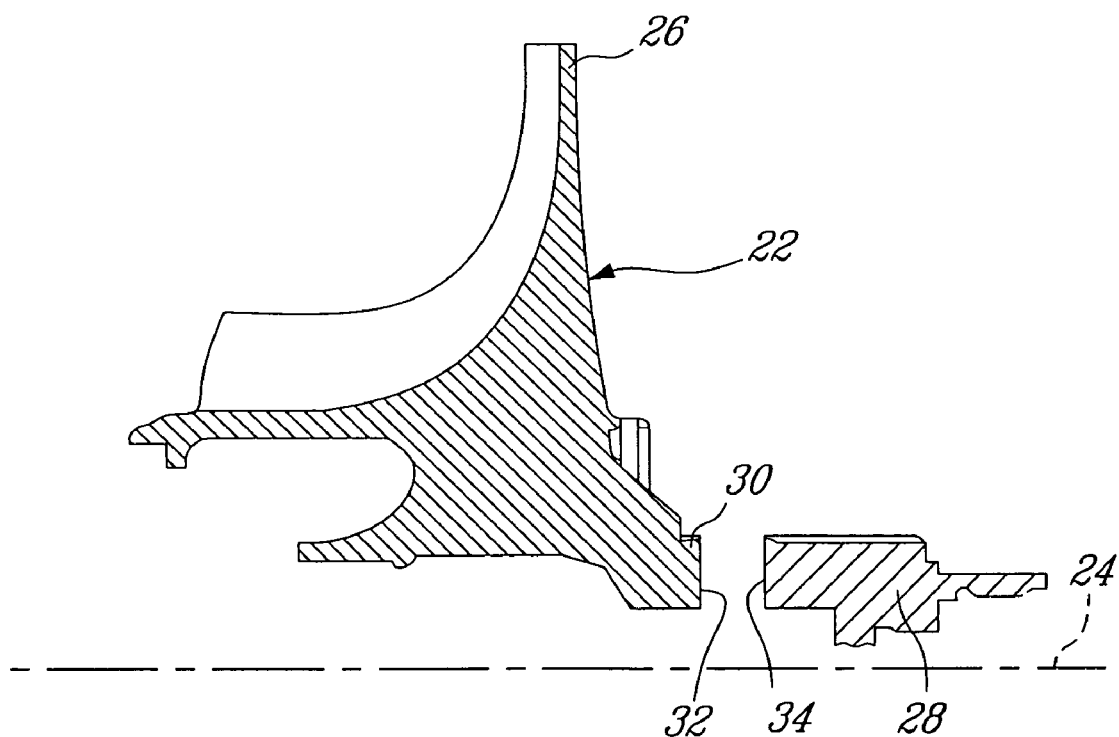
FIGS. 4 and 5 are axial cross-sectional views of an integrally bladed centrifugal compressor rotor in accordance with an aspect of the present invention.

Referring to FIG. 4, the inventors have found a novel configuration for an impeller which overcomes the difficulties associated with the prior art. The impeller assembly 22 includes blades 26, a stump 30 and a stub shaft 28. The impeller 22 assembly, including blades 26 and stump 30 are integral to one another and made of IMI834, such as Titanium Metals Corporation's Timetal 834 alloy (Ti-5.8Al-4Sn-3.5Zr-0.7Nb-0.5Mo-0.35Si-0.06C), while stub shaft 28 is provided separately for later integration with assembly 22, and preferably provided of a bar of forged of IMI834, although another suitable alloy may be used if desired for stub shaft 28. Stump 30 and stub shaft 28 have mating faces 32 and 34, respectively. End faces 32 and 34 preferably have similar shapes and surface areas.

Impeller 22 is generally provided in the form of a fully heat-treated forging, while stump portion 30 is provided integrally as a part of the forging. According to an aspect of the present invention, stump 30 is sized such that a sufficient amount of work is achieved to provide good mechanical properties to itself and to adjacent portions of the impeller 22. Extrusion of stump 30 is preferably minimized or, more preferably avoided altogether, to thereby avoid introducing unacceptable internal regions of weakness, as will be described in more detail below.

Preferably extrusion is minimized, for example, by forging the part from a billet having a selected diameter relative to the diameter of the stump portion, the billet diameter being selected to minimize or prevent extrusion of the stump portion. In general, a billet having substantially the same diameter as the stump portion is one manner of achieving this objective. In another approach, the stump portion dimension, and in particular diameter and height, are selected so as to minimise, and more preferably negate, the occurrence of extrusion in forming the stump portion. In general, providing stump portion with a height equal to, or preferably less than, the diameter of the stump portion is one manner of achieving this objective. Preferably the height of stump portion is selected to provide enough clearance from the surrounding surface of the part so as to provide enough clearance between the surrounding surface and the weld location to permit the weld flash to be easily removed. In a preferred embodiment, the height of the stump portion is no greater than the height required to provide minimum flash removal clearance.

Stub shaft 28 is provided preferably in the form of a fully heat-treated bar forging, though any suitable method of making may be used.

Figure 5:
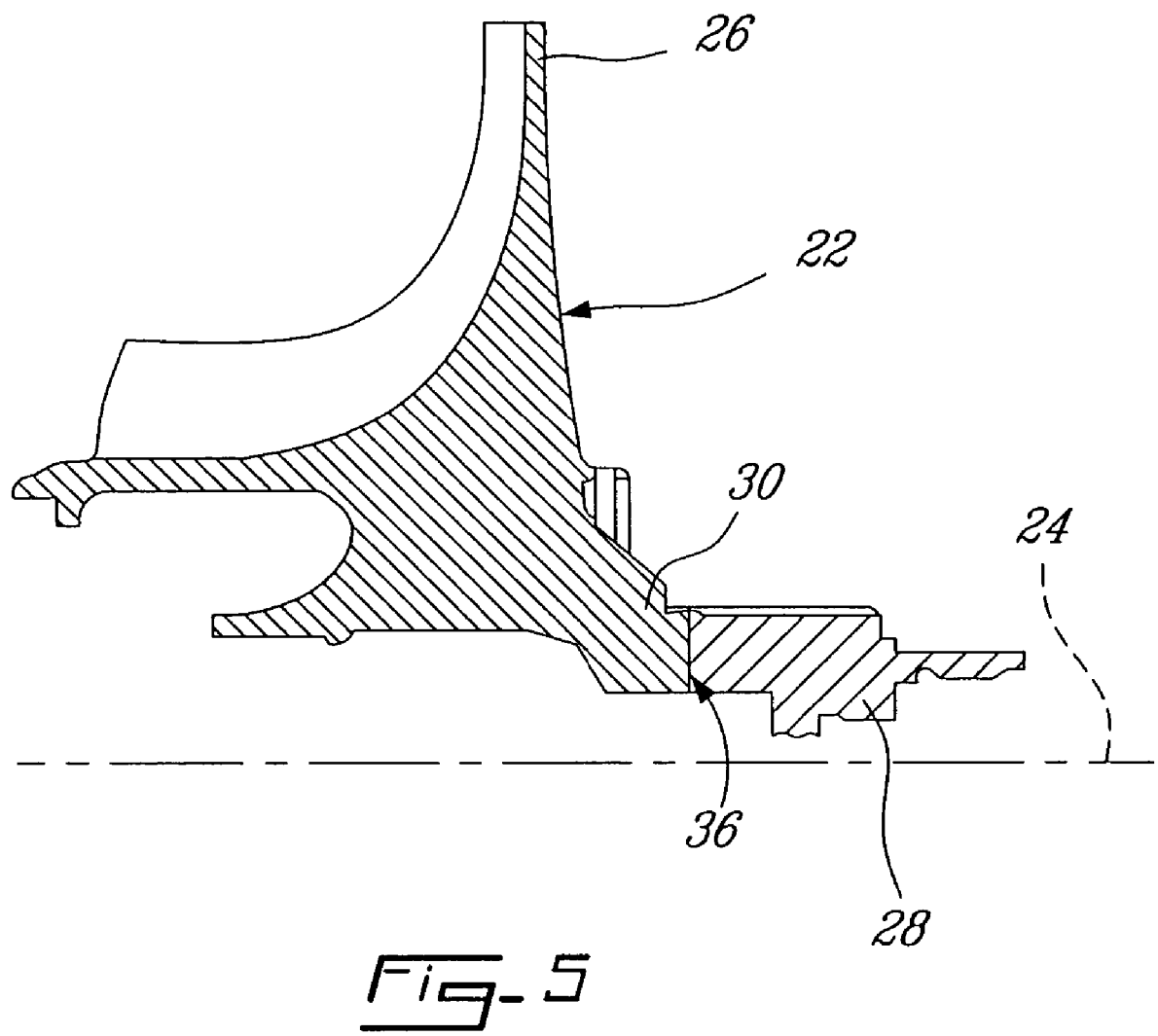

Referring to FIG. 5, the impeller 22 and stub shaft 28 are integrally bonded by friction welding, also sometimes known as inertia welding or inertia bonding. Other types of welding, such as electron beam or laser welding are less desirable and are preferably avoided. The step of friction welding is preferably provided according to the novel method now presented.

Prior art friction welding involves friction welding mating faces together to obtain an integration of components, then the flash around the weld is removed, then the joint is heat treated to relieve stress induced during the friction welding process, and if applicable effect a precipitation reaction to improve the mechanical properties. However, when applying this conventional procedure to friction weld IMI834, cracking can occur proximate the weld during flash removal.

Therefore, according to another aspect of the present invention, a method of friction welding IMI834 is provided in which the steps of friction welding mating faces to adjoin at least two parts. In this example, faces 32 and 34 are friction welded to provide weld bond 36. After the parts are suitably bonded together, the bonded assembly is then heat treated to relieve stresses in weld 36. The heat treatment applied is a typical heat treatment wherein the temperature and the duration are a function of the size and the nature of the components, as will be understood by one skilled in the art. After the heat treatment step, the flash is then removed by appropriate machining, and then sent for final machining and finishing. The inventors have found that applying the heat treatment before flash removal beneficially reduces cracking during flash removal.

It has been found that, unlike other titanium alloys, IMI834 should not be extruded since this is likely to have an adverse affect on the metallurgical texture of the material, creating regions of weakness that are unfavourably oriented to the stresses created in the part during operation. The presence of the extruded shaft also makes it difficult to maximize the amount of deformation in the centre of the forging during the forging process. Likewise, the present approach avoids problems caused by doing an insufficient amount of work on the forging. Therefore, the present solution avoids these shortcomings of the prior art by optimizing the amount of work done in forging, and preferably ensuring that extrusion does not occur.

Modifications and improvements to the above-described embodiment of the present invention may become apparent to those skilled in the art. For example, the present invention need not be applied to centrifugal high pressure impellers, but may be applied to any integrally bladed rotor, including so-called "blisks". The stub shaft may be provided in any suitable fashion of any suitable material. Though described in respect of IMI834, the present invention may be application to other materials exhibiting similar properties to IMI834. Though the term "diameter" is used to refer to the width of the stump portion, it will be understood that the stump portion need not necessarily be forged with a circular cross-section. Still other modifications will be apparent to the skilled reader in light of the teachings above. The foregoing description is intended, therefore, to be exemplary rather than limiting. The scope of the invention is therefor intended to be limited solely by the scope of the appended claims.

We claim:

1. A method for providing a gas turbine compressor impeller, the method comprising the steps of:
   a. forging IMI 834 titanium to provide an impeller blank having a back face and an axis of rotation;

b. forging a stump portion on the impeller blank, concentric with the axis of rotation, the stump portion extending from the back face;
c. providing a metal alloy stub shaft; and
d. assembling the impeller blank to the stub shaft in an axially end-to-end relationship by friction welding the stub shaft to the stump portion, concentric with the stump portion,
wherein the step of forging the stump portion includes ensuring no extrusion of the stump portion occurs during said forging of the stump portion.

2. The method of claim 1 wherein the step of ensuring no extrusion occurs includes the step of providing a billet for use in said forging steps, the billet having a diameter substantially the same as a diameter of said stump portion.

3. The method of claim 1 wherein the stump portion has a height measured from the back face to a stump portion end face, and wherein the height is selected to negate extrusion in the region of the stump portion.

4. The method of claim 1 wherein the stump portion has a diameter and a height, the height measured from the back face to a stump portion end face, and wherein the step of ensuring no extrusion occurs includes ensuring the height is not greater than the diameter.

5. The method of claim 1 wherein the stump portion has a stump height measured from the back face to a stump portion end face, and wherein the method farther comprises the step of determining a minimum clearance height required to provide adequate clearance between the stump height and the back face for accomplishing a weld flash removal step, and wherein the stump portion is forged to have a stump height substantially equal to the clearance height.

6. The method of claim 1 further comprising the steps of heat treating the welded assembly and then de-flashing a weld portion of the welded assembly.

7. A method for making a compressor rotor for a gas turbine engine, the method comprising the steps of:
a. forging an compressor blank from IMI 834 titanium alloy, the blank having an axis of rotation and a stump portion, the stump portion co-axially aligned with the axis of rotation, the stump portion having a height not greater than a diameter of the stump portion to thereby minimize extrusion of the stump portion during said forging;
b. providing a metal alloy component;
c. axially assembling the component to the blank in an end-to-end relationship by friction welding the component to the stump portion of the blank, concentric with the axis of rotation, to provide a welded assembly;
d. heat treating the welded assembly to at least relieve a weld zone; and then
e. removing weld flashing from the weld zone,
wherein the step of forging includes forging a substantially extrusion-free stump portion on the blank coaxially with the axis of rotation.

8. The method of claim 1, comprising forming radially extending blades in the blank.

9. The method of claim 8, wherein the step of forming the blades is carried out by machining the blades in the blank.

10. The method of claim 7, comprising forming radially extending blades in the blank.

11. The method of claim 10, wherein the step of forming the blades is carried out by machining the blades in the blank.

12. The method of claim 11, wherein the component is a stub shaft and the stub shaft is friction weld to a stump portion of the blank and then the blades are machined.

13. A method for providing a gas turbine compressor, the method comprising the steps of:
forging IMI 834 titanium billet to provide a compressor blank having a back face, the billet having a pre-forging effective diameter;
forging a stump portion on the blank, the stump portion extending from the back face, the stump portion having a diameter substantially equal to said effective diameter to thereby minimize extrusion of said stump portion during said forging thereof;
providing a metal alloy stub shaft;
friction welding the stub shaft to the stump portion to provide a welded assembly; and then
machining radially extending blades in the blank.

14. The method of claim 7 wherein the blank is forged from a billet having a pre-forging diameter substantially equal to a post-forging diameter of said stump portion.

15. The method of claim 7 wherein said stump height is selected to be not greater than a height from said blank providing a minimum required clearance to perform said step of removing weld flashing.

16. The method of claim 13 said stump portion has a height not greater than a diameter of said stump portion.

17. The method of claim 1 further comprising the step of configuring said stub shaft for connection to a main turbine shaft of the gas turbine engine.

18. The method of claim 7 further comprising the step of configuring said stub shaft for connection to a main turbine shaft of the gas turbine engine.

19. The method of claim 13 further comprising the step of configuring said stub shaft for connection to a main turbine shaft of the gas turbine engine.

* * * * *